(12) United States Patent
Shenderov

(10) Patent No.: US 7,943,030 B2
(45) Date of Patent: May 17, 2011

(54) ACTUATORS FOR MICROFLUIDICS WITHOUT MOVING PARTS

(75) Inventor: Alexander David Shenderov, Raleigh, NC (US)

(73) Assignee: Advanced Liquid Logic, Inc., Research Triangle Park, NC (US)

(*) Notice: Subject to any disclaimer, the term of this patent is extended or adjusted under 35 U.S.C. 154(b) by 956 days.

(21) Appl. No.: 11/833,576

(22) Filed: Aug. 3, 2007

(65) Prior Publication Data

US 2007/0267294 A1 Nov. 22, 2007

Related U.S. Application Data

(60) Division of application No. 10/430,816, filed on May 6, 2003, now Pat. No. 7,255,780, which is a continuation of application No. 09/490,769, filed on Jan. 24, 2000, now Pat. No. 6,565,727.

(60) Provisional application No. 60/117,002, filed on Jan. 25, 1999.

(51) Int. Cl.
*G01N 27/453* (2006.01)
(52) U.S. Cl. .................... 204/600; 204/601
(58) Field of Classification Search ............. 204/450, 204/600, 547, 643
See application file for complete search history.

(56) References Cited

U.S. PATENT DOCUMENTS

| | | | |
|---|---|---|---|
| 4,390,403 A * | 6/1983 | Batchelder | 204/547 |
| 4,418,346 A | 11/1983 | Batchelder | |
| 4,569,575 A * | 2/1986 | Le Pesant et al. | 359/245 |
| 4,582,391 A | 4/1986 | Legrand | |
| 4,636,785 A | 1/1987 | Le Pesant | |
| 4,701,021 A | 10/1987 | Le Pesant | |
| 4,911,782 A | 3/1990 | Brown | |
| 5,181,016 A | 1/1993 | Lee | |
| 5,472,577 A | 12/1995 | Porter | |
| 5,503,803 A | 4/1996 | Brown | |
| 5,571,410 A | 11/1996 | Swedberg | |
| 5,605,662 A * | 2/1997 | Heller et al. | 422/68.1 |
| 5,731,792 A | 3/1998 | Sheridon | |
| 5,948,328 A * | 9/1999 | Fiedler et al. | 264/5 |
| 5,956,005 A * | 9/1999 | Sheridon | 345/84 |
| 5,980,719 A | 11/1999 | Cherukuri | |
| 5,992,820 A | 11/1999 | Fare | |
| 6,287,831 B1 * | 9/2001 | Tai et al. | 435/173.7 |
| 6,294,063 B1 | 9/2001 | Becker et al. | |
| 6,565,727 B1 | 5/2003 | Shenderov | |

FOREIGN PATENT DOCUMENTS

WO WO 95/23020 A1 * 8/1995

OTHER PUBLICATIONS

Welters et al. "Fast Electrically Switchable Capillary Effects," Langmuir 1998, 14, 1535-1538.*

(Continued)

*Primary Examiner* — Alex Noguerola
(74) *Attorney, Agent, or Firm* — William A. Barrett; Ward and Smith, P.A.

(57) ABSTRACT

A series of microactuators for manipulating small quantities of liquids, and methods of using these for manipulating liquids, are disclosed. The microactuators are based on the phenomenon of electrowetting and contain no moving parts. The force acting on the liquid is a potential-dependent gradient of adhesion energy between the liquid and a solid insulating surface.

50 Claims, 5 Drawing Sheets

OTHER PUBLICATIONS

Hyejin Moon, "Electrowetting-On-Dielectric Microfluidics: Modeling, Physics, and MALDI Application," Ph.D. Dissertation, University of California Dept. of Mechanical Engineering, published Aug. 2006.

Pollack et al., "Electrowetting-Based Actuation of Droplets for Integrated Microfluidics," Lab on a Chip (LOC), vol. 2, pp. 96-101, 2002.

Vijay Srinivasan, Vamsee K. Pamula, Richard B. Fair, "An integrated digital microfluidic lab-on-a-chip for clinical diagnostics on human physiological fluids," Lab on a Chip (LOC), vol. 4, pp. 310-315, 2004.

Altti Torkkeli, "Droplet microfluidics on a planar surface," Doctoral Dissertation, Department of Electrical Engineering, Helsinki University of Technology (Oct. 3, 2003).

Chang-Jin Kim et al., "Electrowetting-Driven Micropumping," UCLA Invention Report, Amendment, Declaration including Invention Report, Petition for Extension of Time, and Authorization to Charge Deposit, submitted to USPTO on Feb. 4, 2005.

F. Berge "Electrocopillarity & writing of insulator films by water" C.R. Acad. Sci, Paris 317(11) 157-163 (1993).

Colgate "An Investigation of Electrowetting-Based Microactuation" J. Vac. Sci-Technol. A 84:3625-3633 (1990).

Washizv "Electrostatic Acturtional Liquid Droplets for Microreaction Applications" IEEE trans. Ind. App. 34(4):732-737 (1998).

Welters "Fast Electrically Switchable Capillary Effects" Languwir 14:1535-1538 (1998).

\* cited by examiner

ACTUATORS FOR MICROFLUIDICS WITHOUT MOVING PARTS

CROSS REFERENCES TO RELATED APPLICATIONS

This application is a divisional of U.S. patent application Ser. No. 10/430,816, filed May 6, 2003 (now U.S. Pat. No. 7,255,780), which is a continuation of U.S. patent application Ser. No. 09/490,769, filed Jan. 24, 2000 (now U.S. Pat. No. 6,565,727), which claims the benefit of provisional patent application No. 60/117,002, filed Jan. 25, 1999.

FIELD OF THE INVENTION

This invention relates generally to the fields of laboratory automation, microfabrication and manipulation of small volumes of fluids (microfluidics), in such a manner so as to enable rapid dispensing and manipulation of small isolated volumes of fluids under direct electronic control. More specifically, the invention relates to a method of forming and moving individual droplets of electrically conductive liquid, and devices for carrying out this method.

BACKGROUND OF THE INVENTION

Miniaturization of assays in analytical biochemistry is a direct result of the need to collect maximum data from a sample of a limited volume. This miniaturization, in turn, requires methods of rapid and automatic dispensing and manipulation of small volumes of liquids (solvents, reagents, samples etc.) The two methods currently employed for such manipulation are, 1) ink jetting and 2) electromigration methods in capillary channels: electroosmosis, elecrophoresis and/or combination thereof. Both methods suffer poor reproducibility.

Ink jetting is based on dispensing droplets of liquid through a nozzle. Droplet expulsion from the nozzle is effected by a pressure pulse in the reservoir connected to the nozzle. The pressure pulse itself is effected by an electric signal. The droplets are subsequently deposited on a solid surface opposing the nozzle. The relative position of the nozzle and the surface is controlled by a mechanical device, resulting in deposition of droplets in a desired pattern. Removal of the droplets is typically effected by either washing or spinning (centrifugal forces).

While ink jetting is a dispensing method generally applicable to a wide variety of liquids, the volume of the deposited droplets is not very stable. It depends on both the nature of the liquid being deposited (viscosity, density, vapor pressure, surface tension) and the environment in the gap between the surface and the nozzle (temperature, humidity). Ink jetting technology does not provide means to manipulate droplets after they have been deposited on the surface, except for removing them.

Electromigration methods are based on mobility of ions in liquids when electric current is passed through the liquids. Because different ions have different mobilities in the electric field, the composition of liquid being manipulated generally changes as it is being transported. While this feature of electromigration methods is, useful for analytical purposes, because it allows physical separation of components of mixtures, it is undesirable in general micromanipulation techniques.

Additionally, the need to pass electrical current through the liquid results in heating of the liquid, which may cause undesirable chemical reactions or even boiling. To avoid this, the electrical conductivities of all liquids in the system are kept low, limiting the applicability of electromigration methods.

The need to pass electrical current through the liquid also requires that the control electrodes be electrically connected through an uninterrupted body of conductive liquid. This requirement additionally complicates precision dispensing and results in ineffective use of reagents, because the metered doses of a liquid are isolated from a continuous flow of that liquid from one electrode to another.

Additionally, ions present in the liquid alter the electric field in that liquid. Therefore, changes in ionic composition in the liquid being manipulated result in variations in resultant distribution of flow and material for the same sequence of control electrical signals.

Finally, the devices for carrying out the electromigration methods have connected channels (capillaries), which are used to define liquid flow paths in the device. Because the sizes of these capillaries and connections among them are optimized for certain types of manipulations, and also for certain types of liquids, these devices are very specialized.

SUMMARY OF THE INVENTION

The present invention provides microchip laboratory systems and methods of using these systems so that complex chemical and biochemical procedures can be conducted on a microchip under electronic control. The microchip laboratory system comprises a material handling device that transports liquid in the form of individual droplets positioned between two substantially parallel, flat surfaces. Optional devices for forming the droplets are also provided.

The formation and movement of droplets are precisely controlled by plurality of electric fields across the gap between the two surfaces. These fields are controlled by applying voltages to plurality of electrodes positioned on the opposite sides of the gap. The electrodes are substantially planar and positioned on the surfaces facing the gap. At least some of the electrodes are electrically insulated from the liquid in the gap.

The gap is filled with a filler fluid substantially immiscible with the liquids which are to be manipulated. The filler fluid is substantially non-conductive. The wetting properties of the surfaces facing inside the gap are controlled, by the choice of materials contacting the liquids or chemical modification of these materials, so that at least one of these surfaces is preferentially wettable by the filler fluid rather than any of the liquids which are to be manipulated.

The operating principle of the devices is known as electrowetting. If a droplet of polar conductive liquid is placed on a hydrophobic surface, application of electric potential across the liquid-solid interface reduces the contact angle, effectively converting the surface into more hydrophilic. According to the present invention, the electric fields effecting the hydrophobic-hydrophilic conversion are controlled by applying an electrical potential to electrodes arranged as an array on at least one side of the gap. The electrodes on the other side may or may not be arranged in a similar array; in the preferred embodiment, there is array of electrodes only on one side of the gap, while the other has only one large electrode covering substantially the entire area of the device.

At least on one side of the gap, the electrodes are coated with an insulator. The insulator material is chosen so that it is chemically resistant to the liquids to be manipulated in the device, as well as the filler fluid.

By applying an electrical potential to an electrode or a group of electrodes adjacent to an area contacted by polar liquid, the hydrophobic surface on top of these electrodes is converted to hydrophilic and the polar liquid is pulled by the surface tension gradient (Marangoni effect) so as to maximize the area overlap with the charged group of electrodes.

By removing an electric potential from an electrode positioned between the extremities of an elongated body of polar liquid, the portion of formerly hydrophilic surface corresponding to that electrode is made hydrophobic. The gradient of surface tension in this case acts to separate the elongated body of liquid into two separate bodies, each surrounded by a phase boundary. Thus, individual droplets of polar liquid can be formed by alternatively applying and removing an electric potential to electrodes. The droplets can be subsequently repositioned within the device as discussed above.

Examples of appropriate coating materials include SiN and BN, deposited by any of the conventional thin-film deposition methods (sputtering, evaporation, or preferably chemical vapor deposition) and parylene™, deposited by pyrolytic process, spin-on glasses (SOGs) and polymer coatings (polyimides, polymethylmetacrylates and their copolymers, etc.), dip- and spray-deposited polymer coatings, as well as polymer films (Teflon™, polyimides etc.) applied by lamination.

DETAILED DESCRIPTION OF THE INVENTION

Figure 1:
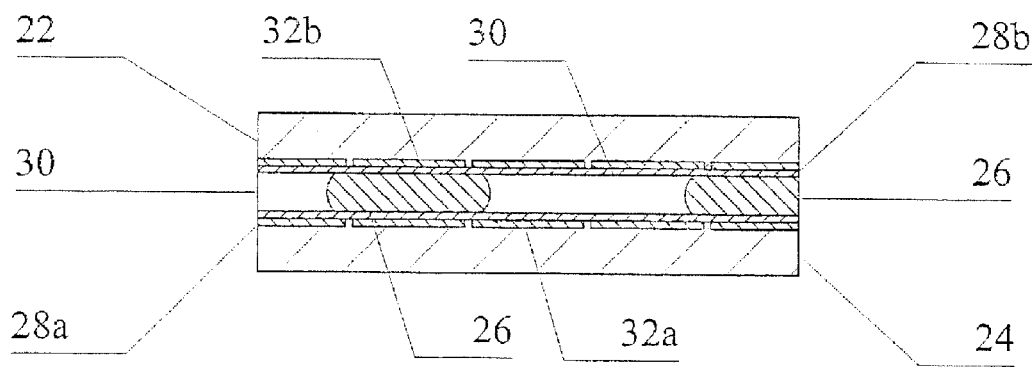
FIG. 1 Cross-section of a planar electrowetting actuator according to the invention
22—top wafer
24—bottom wafer
26—liquid droplet
28a—bottom hydrophobic insulating coating
28b—top hydrophobic insulating coating
30—filler fluid
32a—bottom control electrodes
32b—top control electrodes
FIG. 2 Pump assembly
FIG. 3 Drop meter
34—contact pad
36—cutoff electrode
FIG. 4 Active reservoir
38—hydrophobic rim
40—reservoir electrodes
FIG. 5 Array
42a—transport lines
42b—test areas
FIG. 6 Vortexer
44—sectorial electrode
FIG. 7 Zero-dead-volume valve
62—gate electrode
64a—first supply line
64b—second supply line
64c—common line
FIG. 8 Decade dilutor
46—diluent line
48—reagent supply line
50—vortexer
52—undiluted reagent outlet
54—first stage outlet
56—second stage outlet
58—third stage outlet
60—fourth stage outlet

According to the invention, there is provided a chamber filled with a fluid, with flat electrodes 32a,b on opposite surfaces (FIG. 1). The chamber is formed by the top 22 and the bottom 24 wafers. The manipulated liquid is presented in the form of droplets 26. The fluid 30 filling the chamber should be immiscible with the liquid that is to be manipulated, and be less polar than that liquid. For example, if liquid 26 is an aqueous solution, the filling fluid 30 may be air, benzene, or a silicone oil. The electrodes have electrical connections allowing an outside control circuit to change their potentials individually or in groups. At least some of the electrodes have insulating, hydrophobic coating 28a,b separating them from the inside of the chamber, and the voltage is applied in such a manner that no DC voltage difference is applied to any two non-insulated electrodes.

EXAMPLE 1

A Pump

Figure 2:
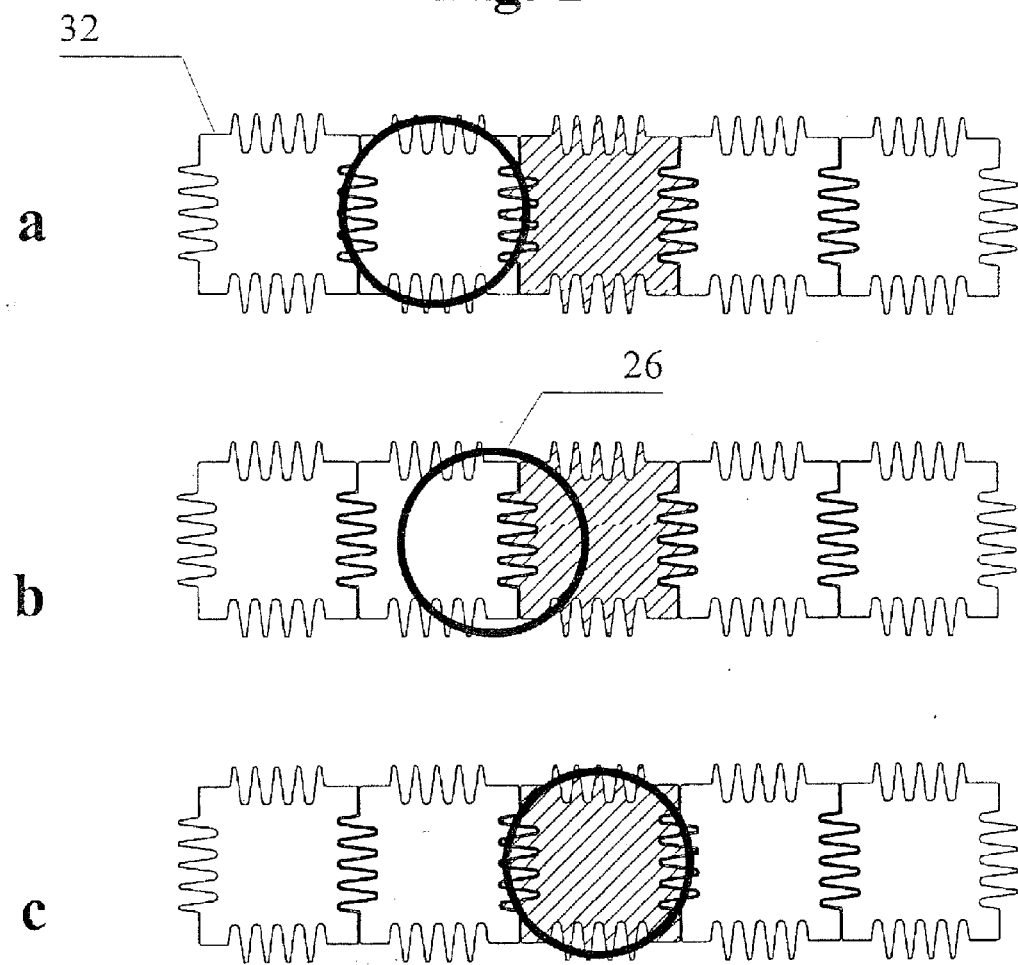

The linear arrangement of electrodes shown in FIG. 2 is an integral pump. A droplet of polar liquid, or a streak of several electrode lengths, can be moved along by applying a wetting potential to an electrode on one side of it and removing the wetting potential from the last electrode under the other side of the streak.

To aid the effect of electrowetting in moving liquid from one electrode to another, in a preferred embodiment the gap separating two adjacent electrodes is not straight. Preferably, it has either sawtooth or meander shape, preferably with rounded corners. The depths and widths of the interdigitated features of the adjacent electrodes are preferably chosen so as to promote moving liquid from one electrode to another when the voltage is applied to the latter electrode, as shown in FIG. 2 a-c. The initial position of the droplet 26 is shown in FIG. 2a. The hatching of an electrode 32 adjacent to the position of the droplet indicates that that electrode is connected to a voltage source. The droplet 26 moves (FIG. 2b) so as to align itself with the electric field of that electrode (FIG. 2c).

EXAMPLE 2

A Drop Meter

As a convenient interface between a microfluidics device operating in subnanoliter to microliter range of volumes with the outside world, a drop meter is provided. The drop meter comprises an arrangement control pads on one side of the chamber (FIG. 3a). The contact pad 34 is either hydrophilic due to material it is made of, or due to a surface treatment, or made hydrophilic by applying a wetting potential to an underlying electrode. The other two control pads have electrodes under the hydrophobic surface.

Figure 3:
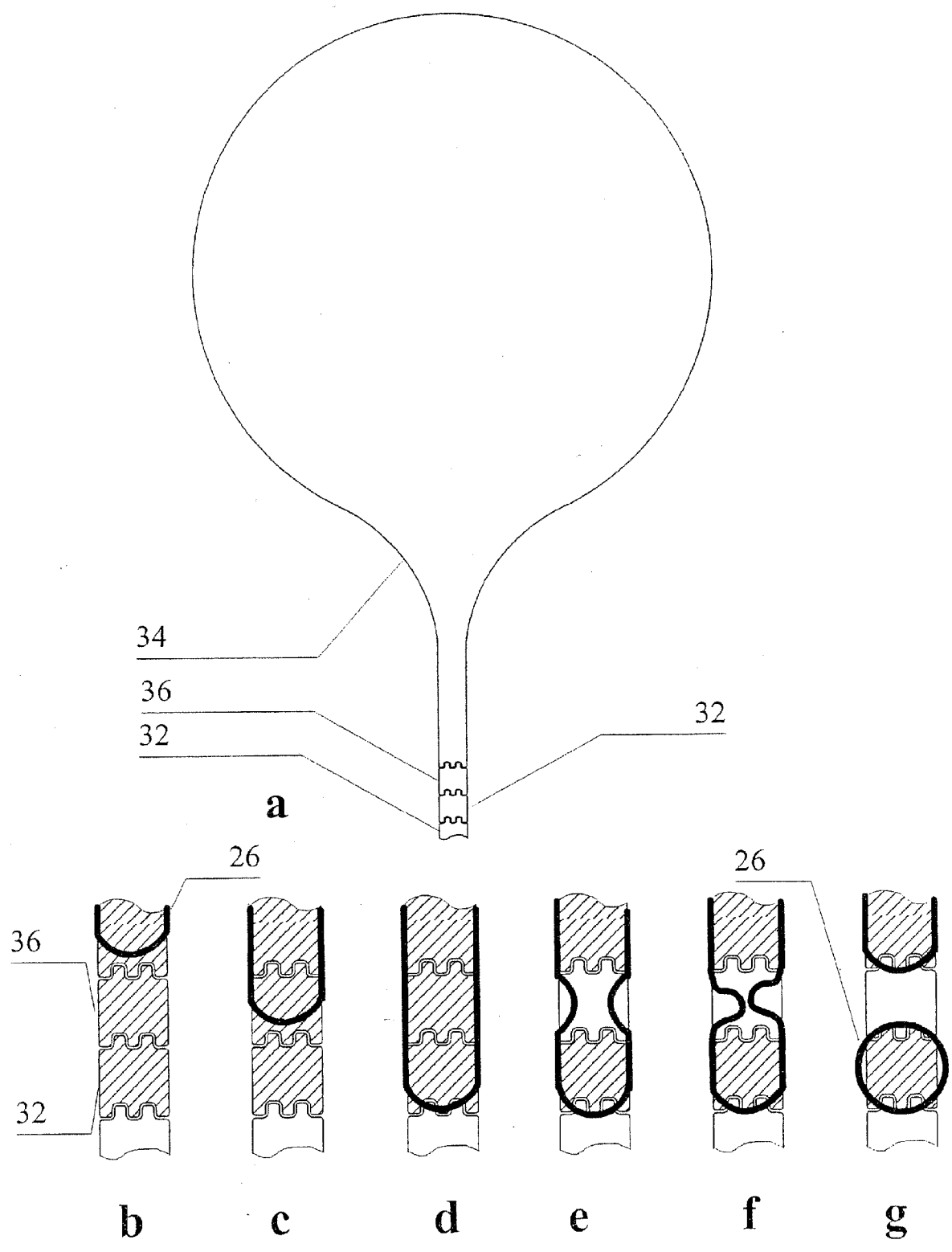

To operate the drop meter, a wetting potential is first applied to the cutoff electrode 36 and the control electrode 32. As a result of this, the liquid which has covered the surface of the contact pad 34 spreads over the other two pads, 32 and 36 (FIG. 3 b-d). Consequently, the wetting potential is removed from the cutoff electrode 36, making it hydrophobic again. Part of the liquid moves back to the contact pad 34, and is replaced on the cutoff electrode 36 with the filling fluid (FIG. 3 e-f). As a result, an isolated droplet of liquid (26, FIG. 3g) is formed on the control electrode 32. The size of the droplet is determined by the area of the control electrode 32 and the distance between the two surfaces forming the working chamber of the device.

EXAMPLE 3

An Active Reservoir

Figure 4:
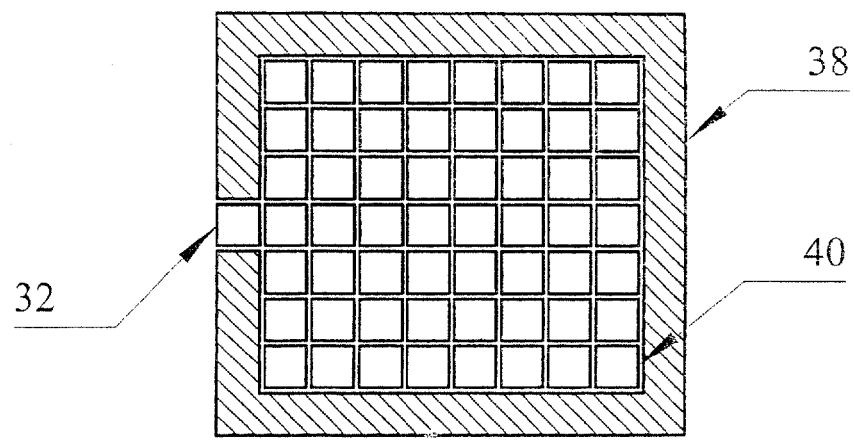

A reagent solution may be stored in an active reservoir in a sealed device and delivered under electronic control to a reaction site. An example of such reservoir is shown in FIG. 4. The delivery is effected by applying the wetting potential to the first electrode 32 of the transport line and removing the potential sequentially from the reservoir electrodes 40, for example beginning from the corner(s) furthermost from the transport line. To allow for long storage of the devices with power off, the coating within the reservoir area is only moderately hydrophobic, and the rim 38 around that area is extremely hydrophobic. The polar liquid will not spill beyond the rim 38, allowing long shelf life of the device.

EXAMPLE 4

An Array

Figure 8:
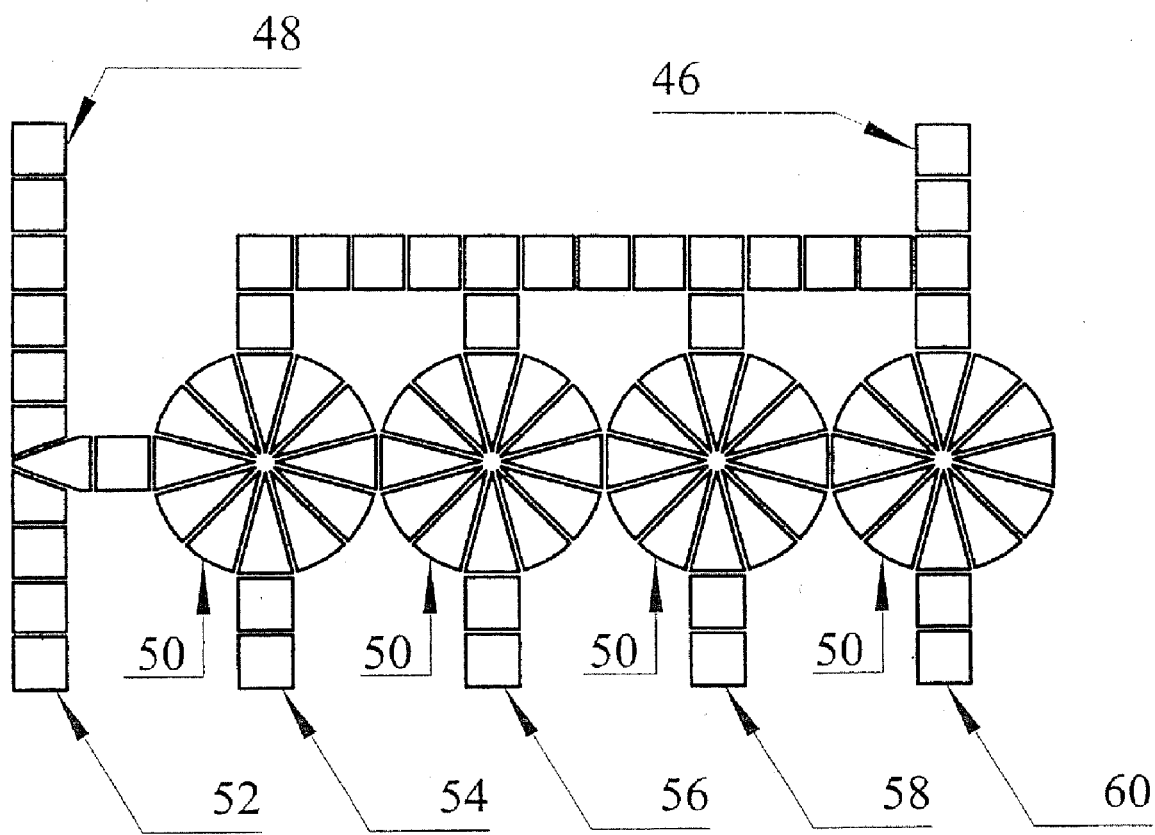

Droplets can be moved by electrowetting microactuators in more than one direction. The array shown in FIG. 5 comprises test areas 42b (hatched) and transport lines 42a (open). Reagents are supplied through external transport lines, shown (broken) in the top part of the drawing. Wash and waste lines are arranged similarly. The sources of the reagents may be reagent reservoirs as shown in FIG. 4, drop meters as in FIG. 3, or integral dilution devices such as shown in FIGS. 6,8. In a preferred embodiment, the test pad electrodes are transparent, for example made of indium tin oxide (ITO) or a thin, transparent metal film, to allow for optical detection of molecules immobilized on the pad or trapped in the droplet.

Such an array has utility as a system for parallel synthesis of many different reagents. Both solid-phase synthesis of immobilized compounds and liquid-phase synthesis using immobilized reagents, resins and catalysts are possible. Another use of such an array is a fraction collector for capillary electrophoresis or similar separation methods, whereby each fraction is isolated by a drop meter (similar to that shown in FIG. 3) and placed on its individual pad 32. This will allow long signal accumulation time for optical and radioactive detection methods and therefore improve sensitivity of analysis.

Important features of the electrodes in an array are the width of the gap between the electrodes and the shape of the electrode outline. To avoid accidental mixing of droplets on the test pads, the gaps separating those are straight and relatively wide. On the other hand, the electrodes in the transport lines preferably have interdigitated sawtooth or meander outlines. The gaps between the test pad electrodes and transport line electrodes are also preferably of the meander or sawtooth types.

EXAMPLE 5

A Mixer/Vortexer

For controlled mixing of solutions, an integral mixer/vortexer is provided (FIG. 6). It comprises a circular arrangement of sectorial electrodes 44, some of which have transport line electrodes adjacent to them. The necessary number of the sectors is filled with each solution to be mixed by consecutively applying the wetting potential to the respective electrodes. The sectors initially filled with different solutions are preferably isolated from each other by the interspersed sectors with filler fluid. Then the potentials on the transport lines are removed, and those on sectorial electrodes are rearranged so as to bring the solutions into contact. The mixing action is achieved by simultaneous removal of filler fluid from some of the sectors and filling other sectors with the filler fluid. In particular, vortexer action is achieved if this is done in a sequential fashion around the circle.

Alternative configurations of electrodes are possible for achieving the same goal of assisting in mixing solutions. For example, some of the sectors in an arrangement similar to that shown in FIG. 6 could be made narrower and longer than the other sectors.

EXAMPLE 6

A Zero-Dead-Volume Valve

To rapidly exchange solutions contacting a particular pad in an array, a zero-dead-volume valve is provided. An example of electrode configuration for this application is shown in FIG. 8. Supply lines 64a and 64b are connected to the line 64c through gate electrode 62. Either of the supply lines is operated in the manner described in Example 1, while wetting potential is applied to the gate electrode. Removal of the wetting potential from the gate electrode 62 allows to move one of the solutions back up its supply line before the other is transported down its respective line. This arrangement has utility, for example, in systems for determination of reaction kinetic constants.

EXAMPLE 7

A Decade Dilutor

A group of mixer/vortexers such as that shown in FIG. 6 can be used, complete with piping, for serial dilutions of reagents. An example of a decade dilutor with five decades is shown in FIG. 8. Each mixer in the decade dilutor is operated in the manner described in the Example 5. Undiluted solution is passed directly through to the line 52; diluted 10 times, down the line 54, and also to the next mixer 50; from there, solution diluted 100 times is passed both down the line 56 and to the next mixer 50 and so forth.

Figure 5:
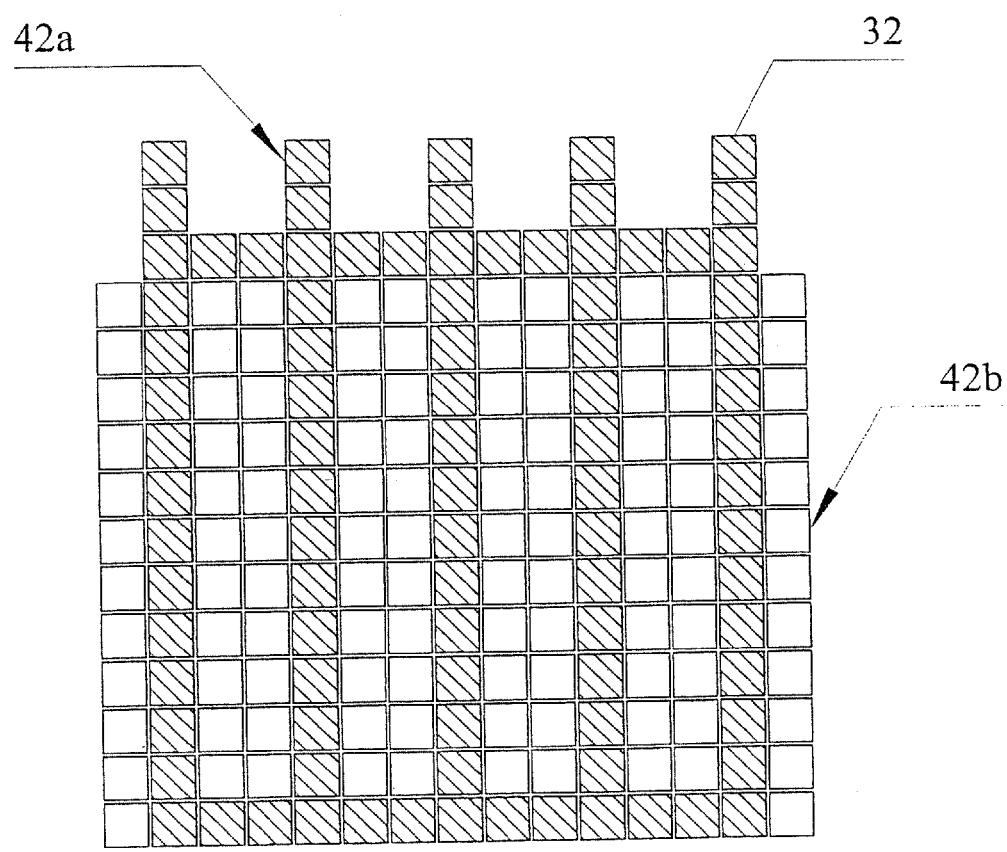
Figure 6:
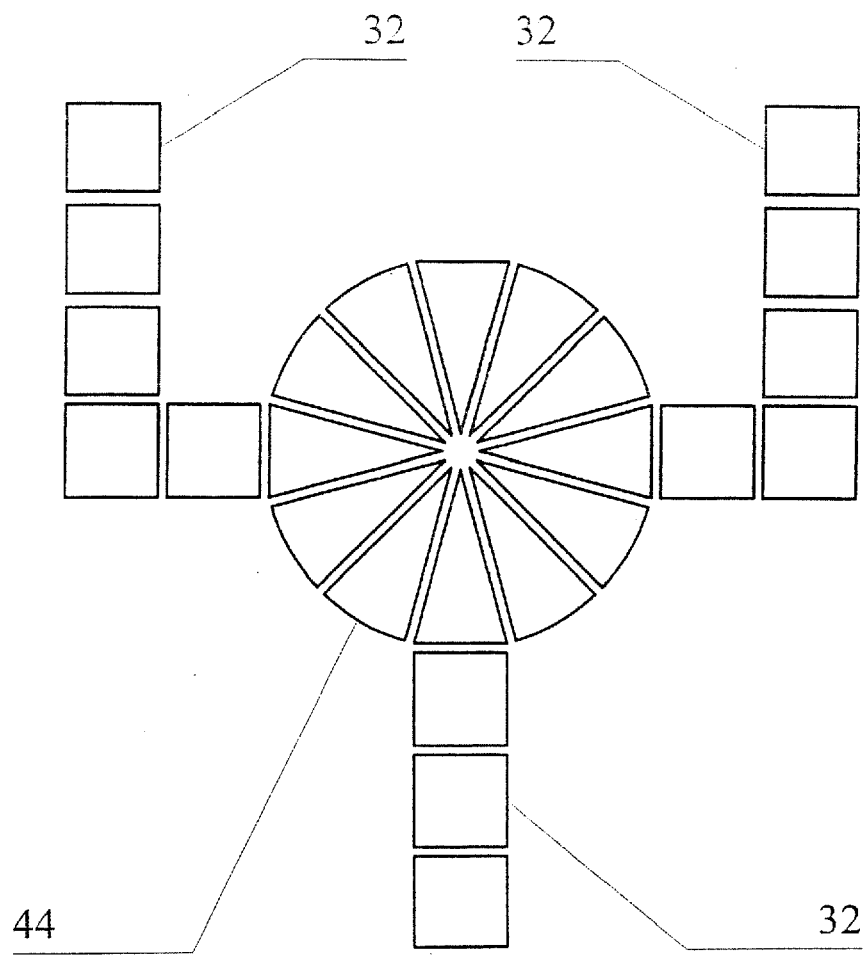
Figure 7:
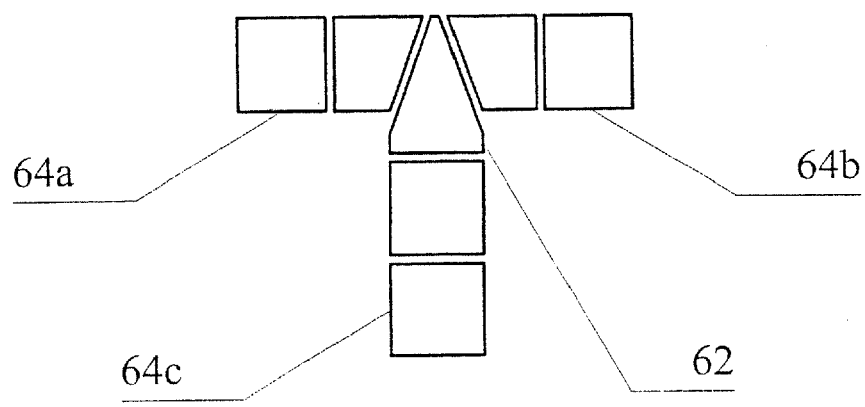

Such dilutors have utility, for example, as elements of a system for determination of binding constants of labeled reagents in solution to those immobilized on test pads of an array (similar to that shown in FIG. 5).

While the present invention has been described in terms of particular embodiments, it should be understood that the present invention lies in the application of the electrowetting liquid propulsion principle to forming and manipulating discrete droplets of liquids rather than a particular structure or configuration of the device. It will be obvious to those skilled in the art that a variety of electrode configurations and arrangements can be substituted for those described in the Examples without departing from the scope of the present invention. In particular, the dimensions in the figures should be understood only as illustrative examples rather than set dimensions defining the scope of the present invention.

That which is claimed is:

1. A device comprising:
   (a) a first surface and a second surface separated from one another to form a gap between the first and second surfaces;
   (b) a plurality of electrodes mounted on the first and second surfaces and facing the gap, wherein the plurality of electrodes comprises a single electrode on one of the surfaces;
   (c) an insulator separating at least a subset of the electrodes from the gap; and
   (d) a drop meter comprising a contact pad, a cutoff electrode, and a control electrode, wherein the contact pad is adjacent to the cutoff electrode, and the cutoff electrode is adjacent to the control electrode.

2. The device of claim 1 wherein the contact pad comprises an underlying electrode.

3. The device of claim 1 wherein the contact pad comprises a hydrophilic surface.

4. The device of claim 1 wherein the contact pad has a hydrophilic character imparted by a hydrophilic surface treatment.

5. The device of claim 1 wherein the contact pad comprises a hydrophilic material.

6. The device of claim 1 wherein the plurality of electrodes comprises electrodes coupled by electrical connections to a control circuit.

7. The device of claim 1 wherein the plurality of electrodes comprises electrodes comprising a hydrophilic surface.

8. The device of claim 1 wherein the plurality of electrodes comprises a two-dimensional array of electrodes.

9. The device of claim 1 wherein the plurality of electrodes comprises a linear arrangement of electrodes.

10. The device of claim 1 wherein the plurality of electrodes comprises a two-dimensional array of electrodes on one of the surfaces and the electrodes on such surface are coated with an insulator.

11. The device of claim 1 wherein the plurality of electrodes comprises an array of electrodes on the first surface and a single large electrode on the second surface.

12. The device of claim 1 wherein the plurality of electrodes comprises substantially planar electrodes.

13. The device of claim 1 wherein the plurality of electrodes comprises one or more substantially square electrodes.

14. The device of claim 1 wherein the plurality of electrodes comprises a path or two-dimensional array of one or more substantially square electrodes.

15. The device of claim 1 wherein the plurality of electrodes comprises one or more substantially triangular electrodes.

16. The device of claim 1 wherein the gap comprises a filler fluid therein.

17. The device of claim 1 further comprising:
(a) a filler fluid in the gap; and
(b) a droplet in the filler fluid.

18. The device of claim 1 further comprising:
(a) a filler fluid in the gap; and
(b) a polar droplet in the filler fluid.

19. The device of claim 1 wherein the gap comprises:
(a) a filler fluid in the gap; and
(b) a droplet in the filler fluid;
wherein at least one of the surfaces is preferentially wettable by the filler fluid relative to the droplet.

20. The device of claim 1 wherein the first and second surfaces are arranged to expose to the gap substantially parallel, flat surfaces.

21. The device of claim 1 comprising means for supplying voltage to the electrodes.

22. The device of claim 1 comprising means for generating an electric potential to the electrodes.

23. The device of claim 1 wherein the insulator is hydrophobic.

24. The device of claim 1, wherein the insulator comprises a hydrophobic coating.

25. The device of claim 1 wherein:
(a) the insulator comprises a hydrophobic surface; and
(b) an electric field generated by one or more of the electrodes supplied with an electric potential causes a portion of the hydrophobic surface to take on a hydrophilic character.

26. The device of claim 1 wherein:
(a) the insulator comprises a hydrophobic surface;
(b) the gap comprises a filler fluid;
(c) the filler fluid comprises an immiscible droplet therein adjacent to an electrode; and
(d) the immiscible droplet has a contact angle relative to the surface comprising the electrode, which contact angle is increased relative to the contact angle of the immiscible droplet in the presence of an electric potential.

27. A device comprising:
(a) a first surface and a second surface separated from one another to form a gap between the first and second surfaces, wherein the gap comprises a filler fluid;
(b) a plurality of electrodes mounted on the first and second surfaces and facing the gap;
(c) an insulator separating at least a subset of the electrodes from the gap, wherein the insulator comprises a hydrophobic surface; and
(d) a drop meter comprising a contact pad, a cutoff electrode, and a control electrode, wherein the contact pad is adjacent to the cutoff electrode, and the cutoff electrode is adjacent to the control electrode;
wherein the filler fluid comprises an immiscible droplet therein adjacent to an electrode, and the immiscible droplet has a contact angle relative to the surface comprising the electrode, which contact angle is increased relative to the contact angle of the immiscible droplet in the presence of an electric potential.

28. The device of claim 27 wherein the contact pad comprises an underlying electrode.

29. The device of claim 27 wherein the contact pad comprises a hydrophilic surface.

30. The device of claim 27 wherein the contact pad has a hydrophilic character imparted by a hydrophilic surface treatment.

31. The device of claim 27 wherein the contact pad comprises a hydrophilic material.

32. The device of claim 27 wherein the plurality of electrodes comprises electrodes coupled by electrical connections to a control circuit.

33. The device of claim 27 wherein the plurality of electrodes comprises electrodes comprising a hydrophilic surface.

34. The device of claim 27 wherein the plurality of electrodes comprises a two-dimensional array of electrodes.

35. The device of claim 27 wherein the plurality of electrodes comprises a linear arrangement of electrodes.

36. The device of claim 27 wherein the plurality of electrodes comprises a two-dimensional array of electrodes on one of the surfaces and the electrodes on such surface are coated with an insulator.

37. The device of claim 27 wherein the plurality of electrodes comprises a single electrode on one of the surfaces.

38. The device of claim 27 wherein the plurality of electrodes comprises an array of electrodes on the first surface and a single large electrode on the second surface.

39. The device of claim 27 wherein the plurality of electrodes comprises substantially planar electrodes.

40. The device of claim 27 wherein the plurality of electrodes comprises one or more substantially square electrodes.

41. The device of claim 27 wherein the plurality of electrodes comprises a path or two-dimensional array of one or more substantially square electrodes.

42. The device of claim 27 wherein the plurality of electrodes comprises one or more substantially triangular electrodes.

43. The device of claim 27 wherein the immiscible droplet comprises a polar droplet.

44. The device of claim 27 wherein at least one of the surfaces is preferentially wettable by the filler fluid relative to the droplet.

45. The device of claim 27 wherein the first and second surfaces are arranged to expose to the gap substantially parallel, flat surfaces.

46. The device of claim 27 comprising means for supplying voltage to the electrodes.

47. The device of claim 27 comprising means for generating an electric potential to the electrodes.

48. The device of claim 27 wherein the insulator is hydrophobic.

49. The device of claim 27 wherein the insulator comprises a hydrophobic coating.

50. The device of claim 27 wherein an electric field generated by one or more of the electrodes supplied with an electric potential causes a portion of the hydrophobic surface to take on a hydrophilic character.

* * * * *